United States Patent [19]

Balaba et al.

[11] Patent Number: 5,358,747
[45] Date of Patent: Oct. 25, 1994

[54] SILOXANE COATING PROCESS FOR CARBON OR GRAPHITE SUBSTRATES

[75] Inventors: Willy M. Balaba, Monroeville; George H. Armstrong, New Kensington; Suzanne Kauffman, Apollo; Princewill N. Anyalebechi, Pittsburgh, all of Pa.

[73] Assignee: Aluminum Company of America, Pittsburgh, Pa.

[21] Appl. No.: 997,434

[22] Filed: Dec. 28, 1992

[51] Int. Cl.⁵ ............................................. B32B 9/00
[52] U.S. Cl. .................................. 427/387; 428/408; 428/391; 528/33
[58] Field of Search .................. 428/408, 391; 528/33; 427/387

[56] References Cited

U.S. PATENT DOCUMENTS

| | | | |
|---|---|---|---|
| 3,412,062 | 11/1968 | Johnson et al. | 260/37 |
| 3,484,223 | 12/1969 | Vanderbilt et al. | 65/3 |
| 3,674,542 | 7/1972 | Vanderbilt et al. | 117/72 |
| 3,762,941 | 10/1973 | Hou | 117/93.1 |
| 3,855,174 | 12/1974 | Brie | 260/40 R |
| 3,983,272 | 9/1976 | Huber et al. | 543/850 |
| 4,056,651 | 11/1977 | Scola | 428/336 |
| 4,056,874 | 11/1977 | Kalnin | 75/0.5 |
| 4,270,840 | 6/1981 | Uchida et al. | 350/96.34 |
| 4,311,760 | 1/1982 | Kalinowski et al. | 428/391 |
| 4,316,930 | 2/1982 | Stengle, Jr. | 427/387 |
| 4,376,804 | 3/1983 | Katzman | 428/408 |
| 4,431,982 | 2/1984 | Monroe et al. | 338/214 |
| 4,929,051 | 5/1990 | Rogler et al. | 350/96.3 |
| 4,961,990 | 10/1990 | Yamada et al. | 428/240 |
| 5,054,883 | 10/1991 | Eckberg | 385/145 |
| 5,057,341 | 10/1991 | Ogiso et al. | 427/387 |

FOREIGN PATENT DOCUMENTS

| | | | |
|---|---|---|---|
| 653350 | 12/1962 | Canada | . |
| 662670 | 5/1963 | Canada | 528/43 |
| 1092224 | 4/1989 | Japan | 528/43 |

OTHER PUBLICATIONS

Thermal and Oxidation Stability of Polymethy Phenylsiloxanes, Murphy et al, Industrial and Engineering Chemistry, vol. 42, No. 12, pp. 2462–2468, Dec. 1950.
Anderson, R., B. Arkles, G. L. Larson. *Silicon Compounds Register and Review,* Bistol, Pa.: Petrarch Systems, 1987.
Ismail, I. M. K. "Oxidation of carbon fibers and fabrics in air" University of Dayton Research Institute, Phillips Laboratory OLAC/RKFC, Edwards AFB, Calif. pp. 540–545 undated.
Katzmann, Howard A. "Fibre coatings for the fabrication of graphite-reinforced magnesium composites," *Journal of Material Science,* 1987, pp. 144–148.
Laurent, V., D. Chatain, N. Eustathopoulos. "Wettability of SiC by aluminum and Al-Si alloys," *Journal of Material Science,* 1987, pp. 244–250.

Primary Examiner—Terry J. Owens
Assistant Examiner—Erma Cameron
Attorney, Agent, or Firm—Douglas G. Glantz; David W. Brownlee

[57] ABSTRACT

A polymer-coated carbon is coated with an aromatic polysiloxane liquid coating solution polymerized to have non-linear, ladder-like silicon to oxygen bonding. Carbon fiber or fabric coated with aromatic polysiloxane liquid polymer provides enhanced thermal protection and oxidative stability. The aromatic polysiloxane liquid polymer-coated carbon preferably includes a non-linear, ladder-like aromatic polysiloxane polymer-coated carbon such as provided by polyphenyl-siloxane polymer having the general formula $R_nSiO_{(4-n)/2}$, wherein R comprises phenyl radical, and n has an average value of about 0.95 to 1.05.

8 Claims, 2 Drawing Sheets

SILOXANE COATING PROCESS FOR CARBON OR GRAPHITE SUBSTRATES

FIELD OF THE INVENTION

The present invention relates to polymer coatings for carbon, e.g., such as carbon fibers or fabrics.

BACKGROUND OF THE INVENTION

In the search for high performance materials, considerable interest has been focused on carbon fibers and fabrics. The term "carbon" is used herein in its generic sense and includes graphite as well as amorphous carbon. Graphite fibers are defined herein as fibers which consist essentially of carbon and have a permanent x-ray diffraction pattern characteristic of graphite. Amorphous carbon fibers, on the other hand, are defined as fibers in which the bulk of the fiber weight can be attributed to carbon and which exhibit an essentially amorphous x-ray diffraction pattern. Graphite fibers generally have a higher Young's modulus than do amorphous carbon fibers and in addition are more electrically and thermally conductive. Carbon fabrics are sheet-like products formed from interwoven carbon fibers.

Industrial high performance materials of the future are projected to make substantial utilization of carbon-reinforced composites, and carbon fibers and fabrics theoretically have been described as providing desirable properties for high strength reinforcement. Among the desired properties are corrosion and high temperature resistance, low density, high tensile strength, and high modulus.

Reinforced components made from carbon graphite fibers have been observed to have limitations of undesirably low service ceiling temperatures, especially for applications using carbon graphite fibers exposed to the air or any oxidative environment. At temperatures as low as about 250° C. carbon fibers are known to undergo thermally induced transformations which lead to degradation in strength. Reinforced components made from carbon graphite fibers, including carbon fiber/carbon fabric reinforced composites, can only be used up to a service ceiling temperature of about 400° C. At temperatures approaching 400° C. and above, the carbon fiber or fabric oxidizes, and the mechanical properties in the carbon composite degrade.

Technical efforts have been made to develop a thermal protection for the carbon fibers to increase this limited service ceiling temperature and to eliminate the erosion in properties which begins at about 250° C. Currently, it is known to coat carbon graphite fibers with inorganic coatings using chemical vapor deposition such as by $SiO_2$ vapor deposition, or by physical vapor deposition, as by nickel vapor deposition. However, the vapor deposition processes are found to be expensive, and further are found to be capable of application only to limited shapes and sizes of the fibers or substrates to be coated. Moreover, these vapor deposition methods would be incapable of uniformly coating fabric material, particularly in areas of interwoven fiber cross-over. The vapor deposition techniques also are known to have residual porosity, which porosity would provide centers of attack by the oxidative agents.

Accordingly, a process is needed for providing thermal and oxidative protection to carbon fibers or fabrics, or the resultant carbon-reinforced composites.

It is an object of the present invention to produce a polymer-coated carbon fiber or fabric having enhanced thermal protection and oxidative stability.

It is a further object of the present invention to produce a polymer-coated carbon fiber or fabric, or a resultant carbon-reinforced composite produced therefrom, in an economical and efficient manner and method, including for the application of the polymer coating.

It is another object of the present invention to provide a carbon fiber or fabric coated efficiently by a polymer coating process scaled up for any shape or size of carbon fiber or fabric to be coated.

It is an object of the present invention to provide a method for synthesizing coatings which confer enhanced thermal protection and oxidative stability to carbon fibers, fabrics, or substrates.

It is another object of the present invention to provide a product and method for providing thermal protection and oxidative stability to carbon fibers or fabrics without requiring high initial capital costs for producing the product or method.

It is a further object of the present invention to provide for coating carbon fibers or fabrics or to form a polymer-coated carbon or graphite fiber or fabric, or a resultant carbon-reinforced composite formed therefrom, having thermal protection and oxidative stability at temperatures higher than about 400° C.

These and other objects of the present invention will become apparent from the detailed description which follows.

SUMMARY OF THE INVENTION

The present invention provides a polymer-coated carbon and includes a specified aromatic polysiloxane liquid solution polymerized to have non-linear, ladder-like silicon to oxygen bonding and further includes coating carbon fiber or fabric with the polysiloxane liquid polymer solution to form a polymer-coated carbon fiber or fabric, or a resultant carbon-reinforced composite formed therefrom, having enhanced thermal protection and oxidative stability at elevated temperatures.

Enhanced thermal protection and oxidative stability is defined as the ability to resist oxidation or to retain physical strength otherwise degraded by thermal exposure or oxidation at temperatures above about 250° C., more preferably at temperatures above about 400° C.

The specified aromatic polysiloxane liquid polymer of the present invention preferably includes a non-linear, ladder-like aromatic polysiloxane polymer such as provided by polyphenylsiloxane having the general formula $R_nSiO_{(4-n)/2}$, wherein R comprises a phenyl radical, and n has an average value of about 0.95 to 1.05.

The polyphenylsiloxane liquid polymer preferably is formed by providing an aromatic silane monomer, acid hydrolyzing the aromatic silane to form a pre-hydrolyzed aromatic silane, and condensing the pre-hydrolyzed aromatic silane to form a non-linear, ladder-like cross-linked polyphenylsiloxane liquid polymer solution.

The polyphenylsiloxane liquid polymer solution is applied to carbon fibers or fabrics as a liquid and then is dried onto the carbon fiber or fabric at a temperature in the range of about 75° C.–110° C. to form a polysiloxane polymer-coated carbon having enhanced thermal protection and oxidative stability at elevated temperatures above about 400° C., e.g., such as in the range of about 400° C. to 600° C.

DETAILED DESCRIPTION

Figure 1:
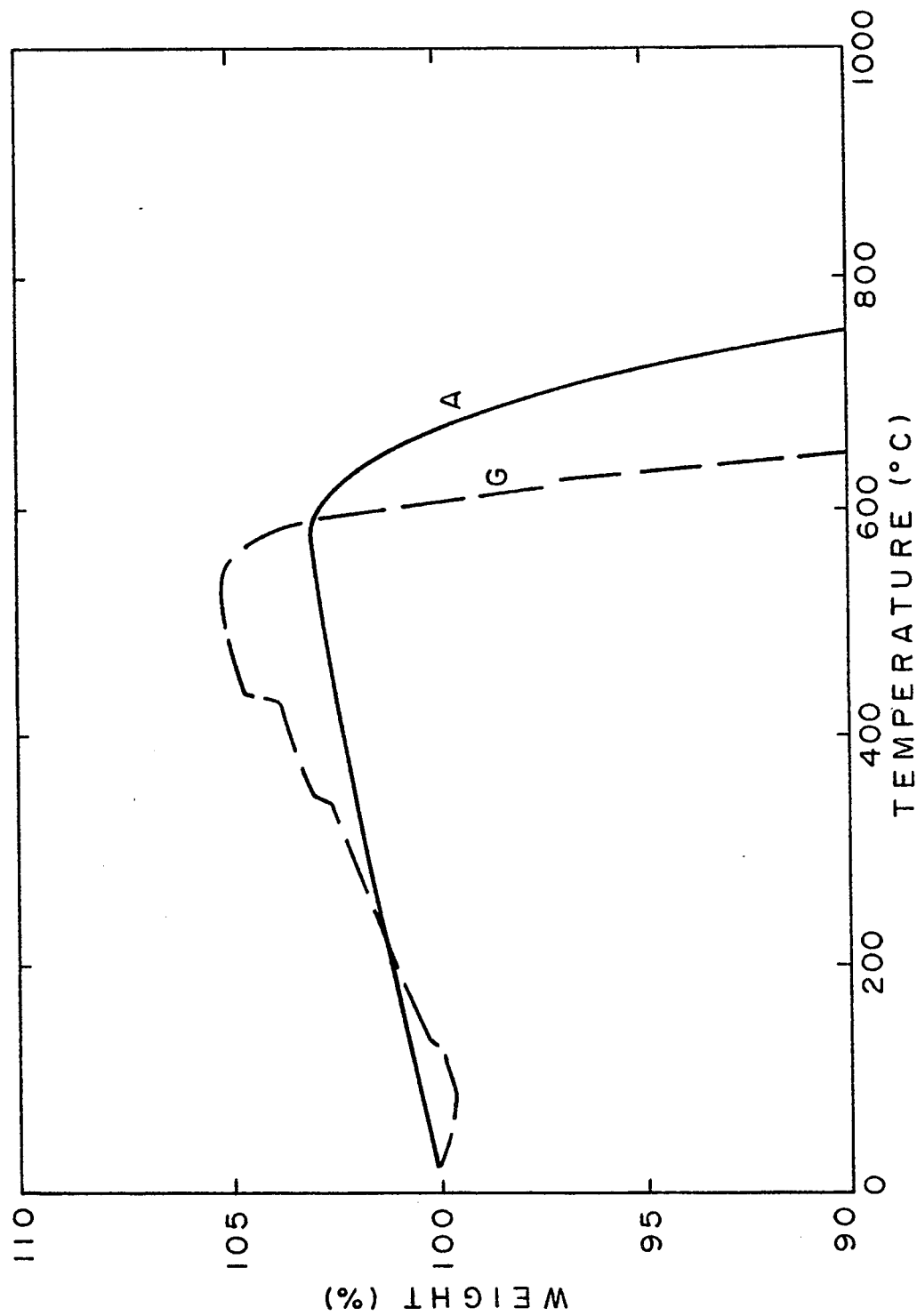
FIG. 1 is a graphical depiction comparing thermal protection and oxidative stability for uncoated carbon graphite fibers and polyphenylsiloxane polymer-coated carbon graphite fibers of the present invention using thermal gravimetric analysis.

The present invention includes applying a polymer coating of a polysiloxane liquid solution onto carbon, i.e., including amorphous carbon or carbon graphite, fibers or fabrics, and drying to evaporate the carrier solvent. The liquid carrier solvent can be dried at a temperature above room temperature, e.g., such as at a temperature preferably in the range of about 75° C–110° C. The carrier solvent preferably can be provided by various proportions of an alcohol/water mixture, such as, in one example, 95% by volume isopropanol/water mixture.

It has been found that the present invention requires a polymer coating of aromatic siloxane. Polysiloxanes other than aromatic siloxane polymers, i.e., such as alkyl, vinyl, or amine polysiloxanes, do not produce the desired thermal protection and oxidative stability provided by the aromatic polysiloxane required in the process and composition of the invention.

The specified aromatic siloxane polymer coating can be prepared by a starting material of aromatic silane which is then hydrolyzed and then chemically condensed to form a cross-linked aromatic siloxane liquid polymer. The resulting composition is used to produce a polymer-coated carbon fiber or fabric having superior thermal protection and oxidative stability. Superior thermal protection and oxidative stability is defined as the ability to resist oxidation or to retain physical strength otherwise degraded by thermal exposure or oxidation, including at temperatures above about 250° C.

The present invention preferably includes a polyphenylsiloxane as the specified aromatic polysiloxane polymer. Preferably, the polyphenylsiloxane polymer comprises a compound having the general formula $R_nSiO_{(4-n)/2}$, wherein R comprises phenyl radical, and n has an average value of about 0.95 to 1.05.

Conventional methods for applying liquid to the carbon fiber or fabric may be used together with known techniques for drying the carrier solvent. In the case of applying the polymer liquid to carbon fabrics, an ultrasonic horn can be employed to assure complete coating of interwoven fiber crossover in the fabric.

The preferred polyphenylsiloxane polymer of the specified formula has been found to provide the desired thermal protection and oxidative stability produced and provided by the process and composition of the present invention.

The present invention produces a polymer-coated carbon fiber or fabric through the steps of providing a polyphenylsiloxane liquid polymer solution polymerized to have non-linear, ladder-like silicon to oxygen bonding, and coating the carbon fibers or fabric with the polyphenylsiloxane liquid polymer solution to form a polyphenylsiloxane polymer-coated carbon fiber or fabric having thermal protection and oxidative stability at elevated temperatures above about 400° C. The polymer-coated carbon product has been observed to provide resistance to oxidation of the carbon, to protect against degradation of physical properties, and to retain strength in coated graphite fibers at temperatures in the range of from about 400° C. to as high as about 700° C. and higher.

The polyphenylsiloxane polymer of the present invention preferably provides an aromatic polysiloxane polymer with a liquid solution containing at least about 50% polyphenylsiloxane and, more preferably, at least about 80% polyphenylsiloxane.

The specified polyphenylsiloxane polymer can be provided by a starting material supplied by an aromatic silane monomer having one phenyl moiety. Preferably, the phenyl moiety is pendant on the silicon. The preferred starting material monomer is phenyltrimethoxysilane as depicted in the following chemical formula.

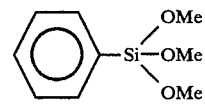

The aromatic silane monomer is hydrolyzed, e.g., by acid hydrolyzing, to form a pre-hydrolyzed aromatic silane which then is condensed to form a cross-linked aromatic polysiloxane. The aromatic polysiloxane polymer preferably has a cross-linked structure to provide non-linear silicon to oxygen bonding, more preferably non-linear, ladder-like silicon to oxygen bonding wherein the phenyl moiety is pendant on the silicon.

It has been found that the aromatic polysiloxane polymer preferably contains a compound having the general formula $R_nSiO_{(4-n)/2}$, wherein R comprises over 50% phenyl radical, and n has an average value of about 0.95 to 1.05. More preferably, R contains over 80% phenyl radical with n having an average value of about 0.95 to 1.05.

The specified polyphenylsiloxane liquid polymer for coating carbon in providing the essential elements of the present invention has a ladder-like cross-linked structure which can be depicted in the following molecular structure.

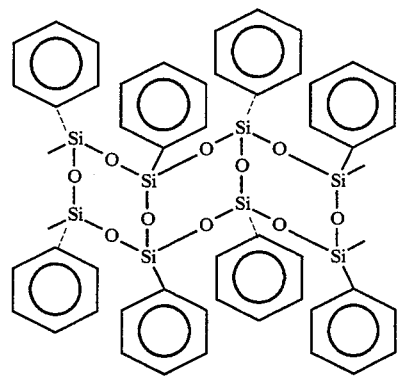

The ladder-like structure of the polyphenylsiloxane polymer of the present invention represents a two dimensional cross-linked structure and differentiates the preferred polyphenylsiloxane of the present invention from three dimensional cross-linked structures. Accordingly, the ladder-like structure specifies a particular definition of the nonlinearity of the preferred heterocyclic polymeric siloxane coating composition of the present invention.

It has been found that polydiphenylsiloxane polymers (which have an n value higher than the specified n value of about 0.95 to 1.05) do not supply the thermal protection and oxidative stability provided by the polyphenylsiloxane polymer-coated carbon fibers, i.e., fibers coated with the polysiloxane of the formula $R_nSiO_{(4-n)/2}$, wherein R preferably comprises over 50% phenyl radical, and n has an average value of about 0.95 to 1.05.

The polyphenylsiloxane liquid polymer solution is applied to the carbon fiber or fabric by coating the carbon fiber or fabric with the liquid solution and then drying the carrier solvent, thereby to deposit the liquid polysiloxane polymer onto the carbon fiber or fabric. The drying step should take place at a temperature above room temperature, e.g., at a temperature in the range of about 75° C.–110° C., more preferably in the range of about 90° C.–105° C.

Prior to coating with the phenylsiloxane liquid solution, the carbon fiber filaments or fabrics preferably are cleaned with one or more polar solvents or pyrolyzed in all inert atmosphere at about 400° C. to drive off any organic sizing. The cleaned carbon fiber filaments or fabrics then can be coated with polysiloxane polymer solution which will adhere directly to the carbon.

The polyphenylsiloxane ladder-like polymer-coated carbon fibers or fabrics are particularly suited for industrial application as polymer-coated carbon-reinforced carbon/carbon or carbon/aluminum matrix or matrices.

EXAMPLE I

A reagent grade isopropanol/water mixture having 95% by volume isopropanol content was adjusted to a pH of about 4.5 using reagent grade acetic acid. Phenyltrimethoxysilane monomer obtained commercially from Huls of America, Bristol, Pa., was added to the isopropanol/water mixture and dissolved to give a 20% by weight solution. The liquid solution thus obtained was refluxed at about 80° C. for about five (5) hours, followed by cooling to room temperature to produce an oligomerized polyphenylsiloxane solution identified as Coating A.

Graphite fiber tows from Hercules, Wilmington, Del. under the trade name Hercules AS4-12+K were cleaned ultrasonically with trichloroethane, acetone, and methanol, each stage taking ten (10) minutes, and subsequently oven dried at about 100° C. for two (2) hours. The cleaned fibers then were coated in an ultrasonic bath with the polyphenylsiloxane Coating A. The Coating A was formed into a glassy coating by heating using a ramp rate of about 20° C. per hour to 200° C. with a soak period at peak temperature for about one (1) hour at atmospheric pressure.

EXAMPLE II

Polydimethoxysiloxane and polymethylsilsesquioxane obtained commercially from Huls of America, Bristol, Pa., were dissolved separately in isopropanol to form liquid Coating B and Coating C, respectively.

Fiber tows obtained from Corning Glass Company of Corning, N.Y. composed of unsized E-2 glass fiber suitable for providing a substrate for testing the thermal protection of polymer coatings were cleaned ultrasonically with trichloroethane, acetone, and methanol, each stage taking ten (10) minutes, and subsequently were oven dried at about 330° C. for two (2) hours. The cleaned fibers then were coated in an ultrasonic bath with the polydimethoxysiloxane Coating B and polymethylsilsesquioxane Coating C. The Coatings B and C were formed into a glassy coating by heating at a ramp rate of about 20° C. per hour to 200° C. and a soak period at peak temperature for about one (1) hour at atmospheric pressure.

EXAMPLE III

A reagent grade isopropanol/water mixture having a 95% by volume isopropanol content was adjusted to a pH of about 4.5 using reagent grade acetic acid. Diphenyldimethoxysilane monomer obtained commercially from Huls of America, Bristol, Pa., was added to the isopropanol/water mixture and dissolved to give 20% by weight solution. The liquid solution thus obtained was refluxed at about 80° C. for about five (5) hours, followed by cooling to room temperature to produce an oligomerized polydiphenylsiloxane solution Coating D.

Graphite fiber tows obtained from Hercules, Wilmington, Del. under the trade name Hercules AS4-12+K were cleaned ultrasonically with trichloroethane, acetone, and methanol, each stage taking ten (10) minutes, and subsequently oven dried at about 100° C. for two (2) hours. The cleaned fibers then were coated in an ultrasonic bath with the polydiphenylsiloxane Coating D. The Coating D was formed into a glassy coating by heating at a ramp rate of about 20° K per hour to 200° C. and a soak period at peak temperature for about one (1) hour at atmospheric pressure.

EXAMPLE IV

The polymer-coated graphite fibers formed in the Examples I, II, and III and uncoated carbon graphite (G) fibers were subjected to thermal gravimetric analysis (TGA) according to the following procedure. With air flowing above the sample, the thermal gravimetric analyzer (TGA) furnace temperature was raised at a constant heating rate until the entire carbon gasified. The change in sample weight was monitored as a function of temperature and time. Sample weight and temperature were monitored every fifteen seconds. The constant heating rate was at 20° C. per minute.

Figure 2:
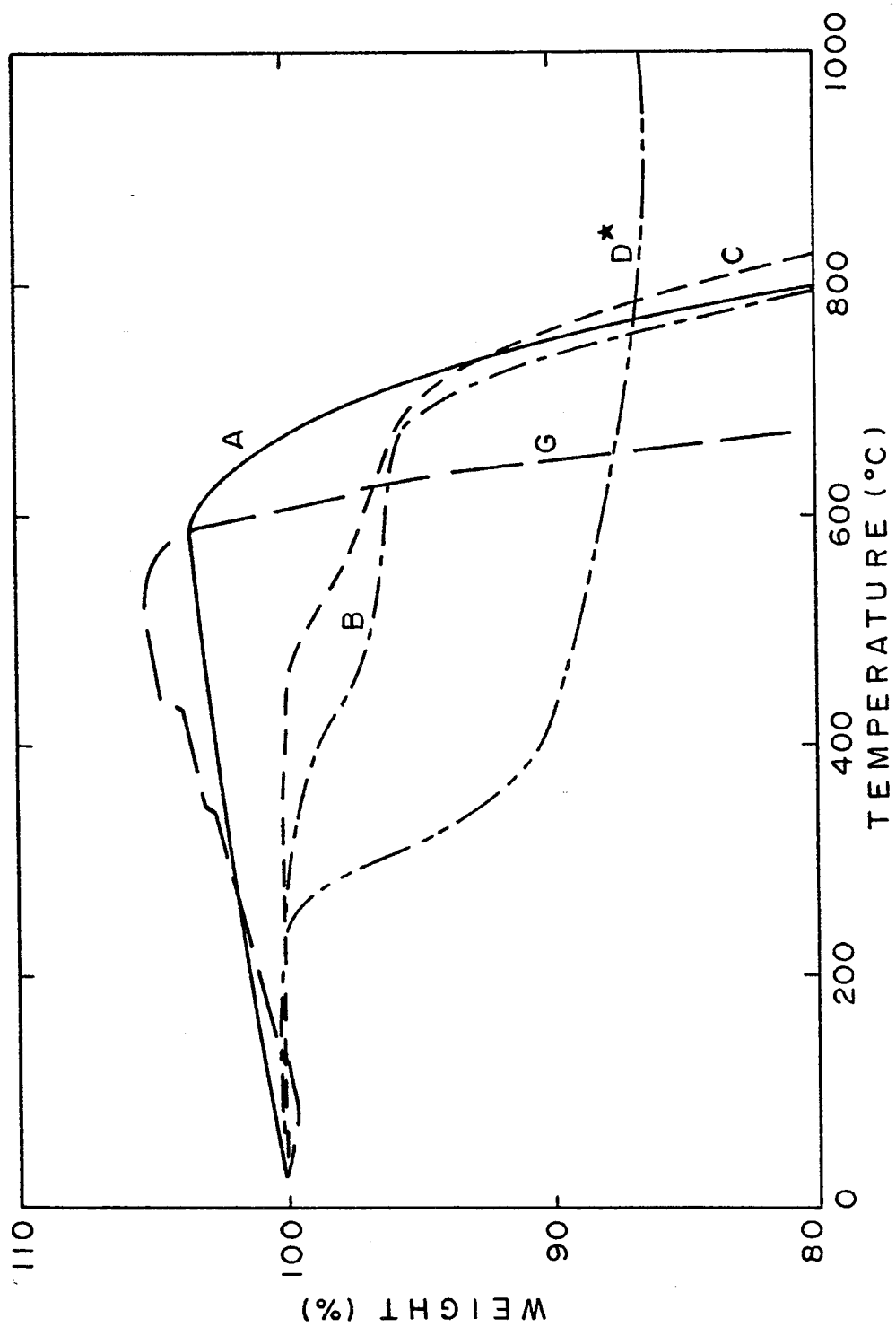
FIG. 2 is a graphical depiction comparing thermal protection and oxidative stability for uncoated carbon graphite fibers and various polysiloxane polymer-coated fibers using thermal gravimetric analysis.

The results of the thermal gravimetric analysis are shown in FIG. 1 for Coating A and uncoated carbon graphite G and FIG. 2 for Coatings A, B, C, and D and uncoated carbon graphite G.

The cleaned and coated carbon fibers coated with the Coating A polyphenylsiloxane polymer formed in Example I exhibited significantly enhanced thermal protection and oxidative stability. The uncoated carbon fibers G were observed to oxidize beginning at temperatures approaching 400° C. as shown by the increase in weight above 100%. The increase in weight was due to oxidized carbon. The oxidized carbon was observed to degrade the strength of the fibers.

The cleaned and coated carbon fibers coated with polymethylsiloxanes B, polymethylsilsesquioxane C, and polydiphenylsiloxane D showed thermal degradation as depicted graphically in FIG. 2 by decreased weight below 100%, but the service ceiling temperature for the carbon graphite fibers coated with the Coating A polyphenylsiloxane non-linear, ladder-like polymer was extended, as shown by an essentially flat graphical plot of weight, to a service ceiling temperature including from 400° C. to above about 600° C.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

We claim:

1. A method for producing a polymer-coated carbon comprising:
    a. providing an aromatic silane monomer in a mixture of an alcohol and water;
    b. acid hydrolyzing said aromatic silane monomer to form a hydrolyzed aromatic silane;
    c. condensing said prehydrolyzed aromatic silane to form a polysiloxane liquid solution consisting of aromatic polysiloxane in said alcohol and water mixture polymerized to have non-linear, ladder polymer silicon to oxygen bonding; and
    d. coating carbon with said aromatic polysiloxane liquid solution to form a polysiloxane polymer-coated carbon.

2. The method as set forth in claim 1, said aromatic polysiloxane consisting of polyphenylsiloxane wherein the phenyl moiety is pendant on the silicon.

3. The method as set forth in claim 2 wherein said aromatic silane monomer comprises a silane monomer having one phenyl moiety.

4. The method as set forth in claim 2 wherein said aromatic polysiloxane consists of a compound having the general formula $R_nSiO_{(4-n)/2}$, wherein
    R comprises a mono-pendant phenyl radical, and
    n has an average value of about 0.95 to 1.05.

5. The method as set forth in claim 2 wherein said coating comprises applying said polysiloxane solution as a liquid onto carbon fiber or fabric.

6. The method as set forth in claim 5 wherein said coating further comprises drying said liquid polysiloxane solution onto said carbon.

7. The method as set forth in claim 6 wherein said coating comprises drying said polysiloxane solution onto said carbon at a temperature in the range of about 75°–110° C.

8. A method for producing a polymer-coated carbon graphite fiber, comprising:
    (a) providing a polysiloxane liquid solution having non-linear silicon to oxygen bonding characterized by the general formula of $R_nSiO_{(4-n)/2}$, wherein R is a phenyl radical and n has an average value of about 0.95 to 1.05, said polysiloxane being formed by acid hydrolyzing a mono-phenyl silane monomer and condensing to form a cross-linked polyphenylsiloxane polymer having ladder polymer heterocyclic silicon to oxygen bonding,
    (b) applying said cross-linked ladder polymer heterocyclic polyphenylsiloxane as a liquid solution in an alcohol and water mixture to carbon graphite fiber, and
    (c) drying said liquid cross-linked, ladder polymer, heterocyclic polyphenylsiloxane onto said carbon graphite fiber at a temperature of about 75° C.–110° C. to form a polysiloxane polymer-coated carbon graphite fiber being substantially infusible above about 400° C. to about 600° C.

* * * * *